US010746046B2

(12) United States Patent
Provost et al.

(10) Patent No.: US 10,746,046 B2
(45) Date of Patent: Aug. 18, 2020

(54) METHOD FOR MANUFACTURING A PREFORM MADE OF WOVEN REINFORCEMENT FIBERS HAVING A VARIABLE CROSS-SECTION

(71) Applicant: Safran Nacelles, Gonfreville l'Orcher (FR)

(72) Inventors: Benjamin Provost, Montivillers (FR); Bertrand Desjoyeaux, Sainte Adresse (FR); Sébastien Louchard, Le Havre (FR); Arnaud Marical, Quilleboeuf sur Seine (FR)

(73) Assignee: SAFRAN NACELLES, Gonfreville l'Orcher (FR)

( * ) Notice: Subject to any disclaimer, the term of this patent is extended or adjusted under 35 U.S.C. 154(b) by 21 days.

(21) Appl. No.: 15/672,638

(22) Filed: Aug. 9, 2017

(65) Prior Publication Data
US 2017/0370247 A1 Dec. 28, 2017

Related U.S. Application Data

(63) Continuation of application No. PCT/FR2016/050304, filed on Feb. 10, 2016.

(30) Foreign Application Priority Data

Feb. 10, 2015 (FR) ..................................... 15 51072

(51) Int. Cl.
*F01D 25/00* (2006.01)
*D03D 3/06* (2006.01)
(Continued)

(52) U.S. Cl.
CPC ............. *F01D 25/005* (2013.01); *D03D 3/06* (2013.01); *D03D 25/005* (2013.01); *D03D 49/00* (2013.01);
(Continued)

(58) Field of Classification Search
CPC ....... F01D 25/005; F01D 25/24; D03D 49/00; D03D 3/06; D03D 25/005; D10B 2505/02;
(Continued)

(56) References Cited

U.S. PATENT DOCUMENTS 694,108 A * 2/1902 Nierhaus et al. ...... D03D 41/00
139/48
2011/0076431 A1 3/2011 Desjoyeau
(Continued)

FOREIGN PATENT DOCUMENTS

FR 2453230 10/1980
WO 2010061140 6/2010
(Continued)

OTHER PUBLICATIONS

International Search Report for International Application PCT/FR2016/050304, dated Apr. 15, 2016.

*Primary Examiner* — Elizabeth C Imani
(74) *Attorney, Agent, or Firm* — Burris Law, PLLC (57) ABSTRACT

The present disclosure provides a method for manufacturing a preform made of reinforcement fibers woven in a longitudinal direction. The preform is impregnated with resin in order to form an elongated element having a variable transverse cross-section. In one form, the method includes the step of simultaneously including a reduction (or increase) in width and an increase (or reduction) in height. The variable cross-section includes, along the length thereof, a consistent number (c) of continuous warp threads arranged in layers. The method for reducing width includes carrying out a change in weave, adding additional weft threads, and simultaneously drawing the teeth of the longitudinal beater reed closer together so as to increase the number of layers.

9 Claims, 5 Drawing Sheets (51) Int. Cl.
*D03D 25/00* (2006.01)
*D03D 49/00* (2006.01)
*F01D 25/24* (2006.01)
*F02K 1/64* (2006.01)

(52) U.S. Cl.
CPC .......... *F01D 25/24* (2013.01); *D10B 2505/02* (2013.01); *F02K 1/64* (2013.01); *F05D 2220/323* (2013.01); *F05D 2230/50* (2013.01); *F05D 2240/10* (2013.01); *F05D 2300/603* (2013.01)

(58) Field of Classification Search
CPC ......... F05D 2300/603; F05D 2220/323; F05D 2230/50; F05D 2240/10; F02K 1/64
See application file for complete search history.

(56) References Cited

U.S. PATENT DOCUMENTS

2011/0311368 A1* 12/2011 Coupe .................. B29C 70/222
416/241 A
2014/0369847 A1* 12/2014 Dambrine ............... B29C 70/24
416/230

FOREIGN PATENT DOCUMENTS

| WO | 2013088039 | 6/2013 |
| WO | 2013104852 | 7/2013 |

\* cited by examiner

METHOD FOR MANUFACTURING A PREFORM MADE OF WOVEN REINFORCEMENT FIBERS HAVING A VARIABLE CROSS-SECTION

CROSS-REFERENCE TO RELATED APPLICATIONS

This application is a continuation of International Application No. PCT/FR2016/050304, filed on Feb. 10, 2016, which claims priority to and the benefit of FR 15/51072 filed on Feb. 10, 2015. The disclosures of the above applications are incorporated herein by reference.

FIELD

The present disclosure relates to a method for manufacturing a woven dry preform intended to be infiltrated with resin to form composite materials, as well as a profile made of composite materials comprising a preform carried out according to such a method.

BACKGROUND

The statements in this section merely provide background information related to the present disclosure and may not constitute prior art.

In order to carry out resistant and lightweight structural elements, particularly in the aeronautical field, it is known to prepare a textile preform from dry fibers, in particular carbon fibers, which is then impregnated with a resin in a tooling, following a method called "LCM" (Liquid Composite Molding) method.

The fluid resin here carries out a complete impregnation of the preform, and the tooling allows a shaping of this assembly. After curing to polymerize the resin, there is obtained an element comprising fibers whose density and orientation are adjusted in order to obtain high mechanical resistance characteristics, adapted to the forces applied to this part.

Particularly, it is possible to produce parts including an elongated shape along a longitudinal direction, having an evolutive variable transverse section.

For example, a rear frame of a thrust reverser cascade for a turbojet engine constitutes an elongated part comprising a constant flat section forming substantially a belt, having at each end its two lateral flanges folded so as to form a yoke including two parallel wings. A transverse drilling of the wings receives an axis allowing, in the longitudinal direction, a clamping traction on the ends.

In the case of an elongated part having a flat section which, in the length, changes the plane to reach 90°, a known solution consists in flat-draping two-dimensional fabric plies, then in deforming this assembly by twisting it along a quarter turn to carry out progressively the change of plane.

However, for this solution, the cutting and the manipulation of a multitude of narrow and slender fabric plies can cause problems of losses of wicks at the edge of plies, and of significant deformations of these plies. In addition, the deformation of the plies can also lead to local disorientations of the fibers, which are not controllable if they are inside the part.

Moreover, the dimensions of such a part with finished sides leaving the molding are difficult to obtain, and in most cases, it is necessary to carry out a machining after the polymerization, which is expensive.

Another solution for carrying out a change of section consists in manufacturing a multi-layer preform of a ribbon type, then in increasing the number of layers locally and progressively by a successive addition of warp and weft yarns.

There is thus obtained a single preform including a local thickening where warp yarns are added successively. However, the absence of continuity of these added yarns greatly reduces the mechanical strength of the assembly, in the areas of variation of the number of yarns.

SUMMARY

The present disclosure provides a method for manufacturing a fibrous preform woven along a longitudinal direction, provided to be impregnated with resin in order to form a longilineal element having an evolutive transverse section, comprising simultaneously a reduction (or conversely an increase) in the width and an increase (or conversely a reduction) in the height, this evolutive section including, lengthwise, warp yarns in constant number which are continuous, disposed in height following layers, remarkable in that, for a reduction in the width, it performs a change of weave introducing additional weft yarns which thus increase the number of layers, and simultaneously it tightens the teeth of the longitudinal settling comb to gradually reduce the space between the warp yarns along the width of the evolutive transverse section, and conversely for an increase in the width, it reduces the number of weft yarns which decreases the number of layers and simultaneously it spreads the teeth of the comb.

An advantage of this method of weaving is that we obtain, in a single operation, a preform containing a fully finished progressive area of variation, comprising continuous warp yarns over the entire length of this variation. This preform allows a reduced labor time during its implementation, as well as a high mechanical resistance in the longitudinal direction.

The woven preform according to the present disclosure can also include one or more of the following characteristics, which can be combined with one another.

Particularly, the manufacturing method can, from a reinforcement having a defined number of layers of superimposed warp yarns, change the weaving pattern by inserting thereby a double number of weft yarns, and then carry out a tightening of the teeth of the comb in order to obtain a double number of superimposed layers having a width reduced substantially by half.

Advantageously, each weft yarn takes, on each layer of warp yarns, one yarn out of four which it leaves on the other side, the yarns taken on each layer being superimposed between the different layers.

Particularly, the method can take sixteen warp yarns between two teeth of the comb.

From a weaving of an upstream flat preform comprising initial width and height, the method can carry out an evolutive section having downstream a width and a final height substantially equal respectively to the height and the initial width. A profile is obtained, having a rotation of its section over 90°.

Advantageously, for some applications, comprising, for example, a final drilling, the method includes a following step for depositing reinforcing fibers on flat faces of a flat section being located close to the evolutive section. In particular, the contour of a drilling can be reinforced.

Particularly, the reinforcing fibers provided for reinforcing a drilling of the flat section, can have two crossed orientations substantially by +/−45° relative to the warp yarns or a concentric orientation relative to this drilling.

The method can also include, during the weaving, a debanding operation of a portion of the constant section close to the evolutive section, carrying out a median section to form a fork. Thus, a yoke comprising a high mechanical resistance is easily carried out.

The present disclosure further provides a composite material profile formed from a preform receiving an injected resin which is carried out with a method comprising any one of the preceding characteristics.

Particularly, the profile can constitute a structural element integrated in a turbojet engine nacelle and having an evolutive section.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
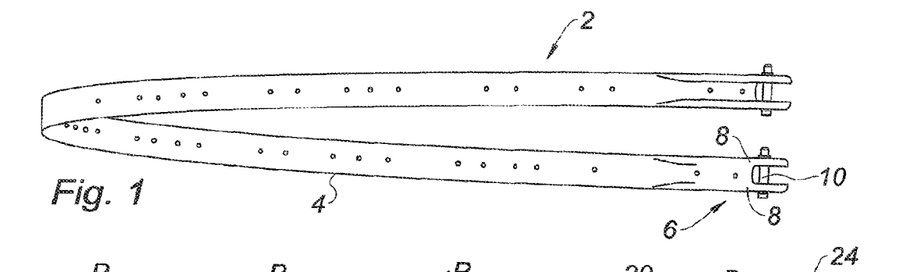
FIG. 1 shows a rear frame of turbojet engine, comprising two ends including an evolutive section carried out with a method according to the teachings of the present disclosure.

FIG. 1 shows a rear frame of the thrust reverser cascade 2 for a turbojet engine nacelle. In a bypass turbojet engine, a circular peripheral flow path surrounds the reactor to conduct cold air of propulsion. In a braking mode of the aircraft, this flow path is closed by shutters to deflect the flow radially outwards, by passing through thrust reverser cascades which directs it forward by generating a braking force.

The rear frame 2 is a fixed belt made of composite materials, disposed at the rear of the thrust reverser cascades, including a flat constant longitudinal section 4 ending at each end 6 by two lateral flanges 8 bent at 90°, forming a yoke comprising a drilling receiving a transverse fixing axis 10.

For its fixation, a high tension is applied on the rear frame by exerting a traction on the transverse axis 10, which is transmitted by the lateral flanges 8 to the flat section 4, without risk of rupture. Particularly, it is desired to carry out an evolutive section in order to switch progressively from the flat section 4 to the end section comprising the flanges 8, including a significant traction resistance.

Figures 2, 3:
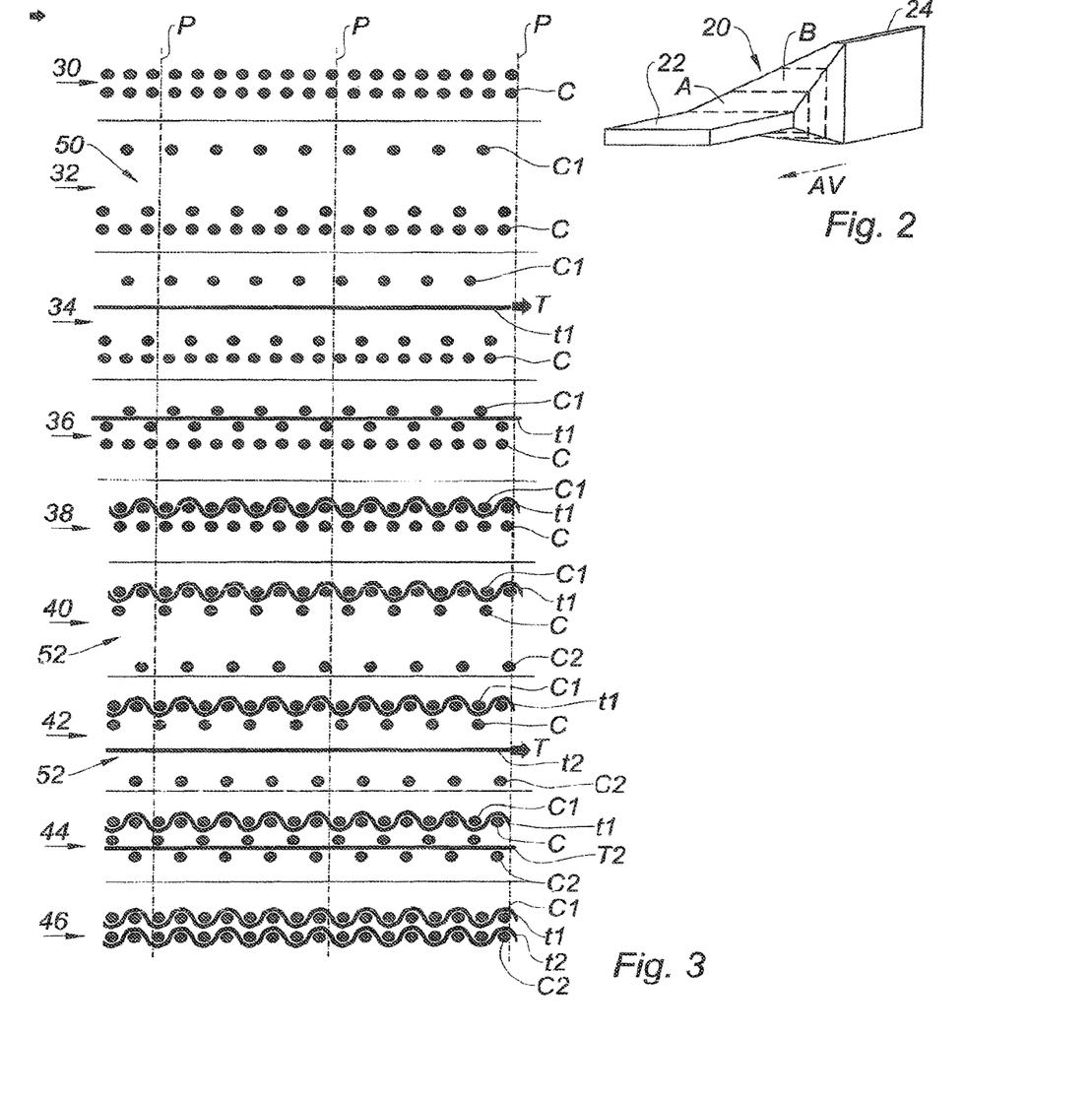
FIG. 2 is a drawing of an evolutive section carried out with a method according to the present disclosure.
FIG. 3 is a diagram showing in cross section successively different steps of weaving the horizontal flat portion upstream of the evolutive section according to the present disclosure.

FIG. 2 shows a preform woven with an advance of the warp yarns following the longitudinal direction indicated by the arrow denoted "AV", comprising a flat horizontal upstream portion 22, followed by an evolutive section 20 which progressively reduces the width and simultaneously increases the height, to reach a vertical flat downstream portion 24 having the section of the upstream portion rotated by 90°.

The evolutive section 20 includes a first portion A beginning immediately after the horizontal upstream portion 22 which is about the first third of the length of this section, and a second portion B which is about the second third of this length.

FIG. 3 schematically shows the successive operations of forming the horizontal flat upstream portion 22, comprising continuous warp yarns c, and weft yarns t inserted successively into these operations.

The first operation 30 includes the production of two similar layers of warp yarns c following two planes, having the yarns which are superimposed two by two. The teeth of a longitudinal compaction comb of the weft yarns t after their insertions, aligned following the axes P, receive eight warp yarns c of each layer between two teeth.

The second operation 32 includes the opening of a shed 50 forming the transverse passage provided to receive a weft yarn, by lifting one warp yarn c1 out of two of the upper layer.

The third operation 34 includes the passage of a weft yarn t1 in the shed 50, following the direction indicated by the arrow T.

The fourth operation 36 includes the closing of the shed 50, by lowering the lifted warp yarns c1. The fifth operation 38 shows the end of the closing of the shed 50, the assembly of the warp yarns c, c1 being disposed again following two layers.

The sixth operation 40 includes the opening of a second shed 52 by lowering one warp yarn c2 out of two of the lower layer, which is vertically offset relative to the warp yarn c1 of the first layer which had been raised.

The seventh operation 42 includes the passage of a weft yarn t2 in the second shed 52.

The eighth operation 44 includes the closing of the second shed 52 by raising the lowered warp yarns c2. The ninth and last operation 46 shows the end of the closing of the second shed 52, the assembly of the fabric returning on the two original planes.

In addition, we have, after the passage of one or more weft yarn(s) t1, t2, a compaction operation of these yarns in the longitudinal direction, by the teeth of the comb disposed following the axes P. For this weaving operation of the constant upstream section 22, the spacing of the teeth of the comb also remains constant.

In general, the upstream portion 22 shown in this example with two layers can include a variable number of layers, with warp and weft yarns woven together according to a conventional interlock pattern allowing linking these layers of yarns together according to a defined pattern of layers.

Figure 4A:
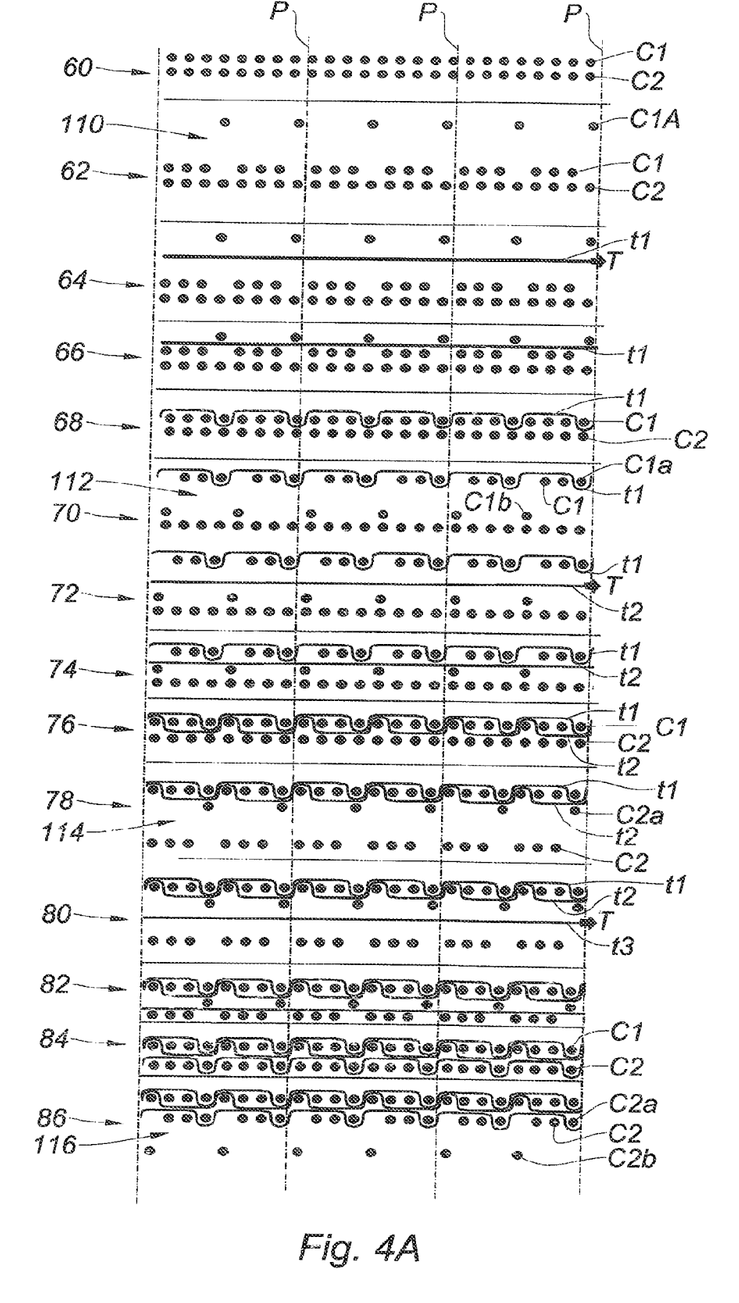
FIGS. 4A and 4B are diagrams showing successively the different steps of weaving the first portion of the evolutive section according to the present disclosure.
Figure 4B:
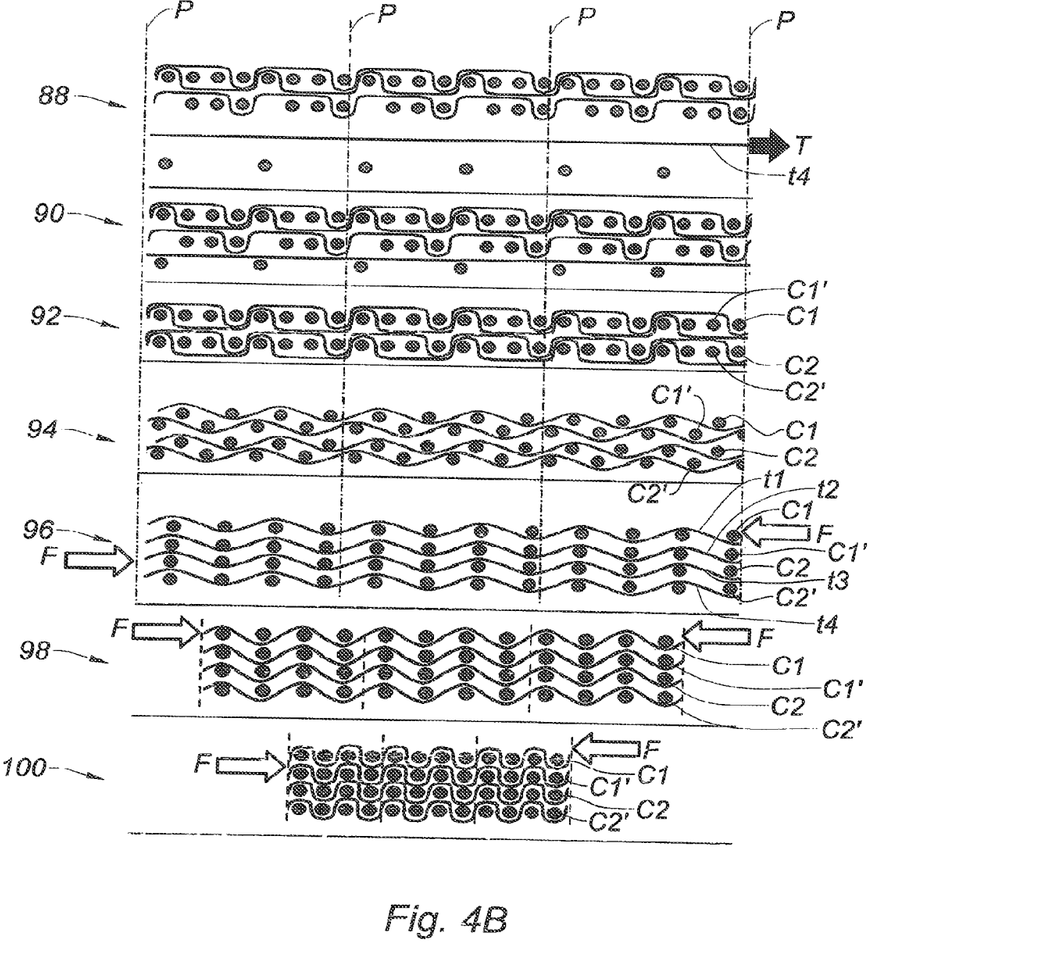

FIGS. 4A and 4B show twenty-one successive operations of forming the first portion A of the evolutive section 20, comprising continuous warp yarns c, and weft yarns t successively inserted into these operations.

The first operation 60 is the recovery of the two identical layers of warp yarns c1, for the upper layer, and c2, for the lower layer, showing the yarns which are superimposed two by two. The teeth of the compaction comb of the weft yarns t after their insertions, aligned along the axes P, receive eight warp yarns c of each layer between two teeth.

The second operation 62 includes the opening of a first shed 110 forming the transverse passage provided to receive a first weft yarn t1, by lifting one warp yarn c1$a$ out of four of the upper layer c1.

The third operation 64 includes the passage of the first weft yarn t1 into the first shed 110, following the direction indicated by the arrow T.

The fourth operation 66 includes the closing of the first shed 110, by lowering the lifted warp yarns c1$a$. The fifth operation 68 shows the end of the closing of the first shed 110, the assembly of the warp yarns c1, c2 being again disposed following two layers.

The sixth operation 70 includes the opening of a second shed 112 by lifting the assembly of the warp yarns of the upper layer c1, except one yarn c1$b$ out of four being located close to a first yarn c1$a$ which has been lifted for the opening of the first shed 110.

The seventh 72, eighth 74 and ninth 76 operations successively include, as above, the passage of the second weft yarn t2, the beginning of the closing of the second shed 112 and the end of this closing. The assembly of the warp yarns c1, c2 are again disposed following two layers.

The tenth operation 78 includes the opening of a third shed 114 comprising, as for the opening of the first shed 110, the lifting of one warp yarn c2$a$ out of four of the lower layer c2, which is aligned with the warp yarn c1$a$ which has been lifted for this first shed.

The eleventh 80, twelfth 82, and thirteenth 84 operations successively include, as above, the passage of the third weft yarn t3, the beginning of closing of the third shed 114 and the end of this closing. The assembly of the warp yarns c1, c2 is again disposed following two layers.

The fourteenth operation 86 includes the opening of a fourth shed 116 comprising, as for the opening of the second shed 112, the lifting of the assembly of the warp yarns of the lower layer c2, except one yarn c2$b$ out of four being located next to a first yarn c2$a$ which has been lifted for the opening of the third shed 114.

The fifteenth 88, sixteenth 90, and seventeenth 92 operations successively include, as above, the passage of the fourth weft yarn t4, the beginning of closing of the fourth shed 116 and the end of this closing. The assembly of the warp yarns c1, c2 is again disposed following two layers.

For all the preceding operations, the longitudinal compaction of the weft yarns t is done with the comb preserving the same spacing of the teeth P.

The eighteenth operation 94 has a lateral displacement of the warp yarns c1, c1', c2, c2' which, under the tension of the weft yarns t, naturally tend to move in height alternately one upwards and the next downwards, depending on their positions above or below the same weft yarn.

During the weaving of the first portion A of the evolutive section 20, a change in the weaving pattern, is performed, which allows a selection of the different warp yarns. This change results, among others, in the insertion of a larger number of weft yarns which, by their binding, allow to form a larger number of layers linked together.

The nineteenth operation 96 has the lateral displacement of the warp yarns c1, c1', c2, c2' which continues in the same way, with a natural tendency to be aligned with each other to form four columns between two teeth of the comb P. A rearrangement of the warp yarns is observed under the tension of the weft yarn t, the latter naturally tend to move in height alternately one upwards and the other downwards, depending on their positions above or below the same weft yarn.

Due to the new weaving pattern, binding less yarns together, the warp yarns have a natural tendency to be aligned with each other to form a column between two teeth of the comb P.

The twentieth operation 98 has a tightening of the gap between the teeth of the comb P, indicated by the arrows F, which drives an approximation of the columns of warp yarns c together.

The twenty-first and last operation 100 has, at the end of the approximation of the teeth of the comb P, spacings between these teeth which is reduced substantially by half. We obtain a woven reinforcement of four layers of warp yarns c comprising a density of warp yarns on surface similar to that of the two-layer starting fabric shown by the ninth operation 46 of FIG. 3, with a thickness which is doubled.

There is thus a first evolution of the evolutive section 20, comprising a width gradually decreased by half and a height gradually doubled.

Particularly, it is desired to provide for the weaving of this type of preform, an automated weaving machine comprising an evolutive comb, capable of modifying, during the manufacturing, the spacing of its teeth.

Figure 5:
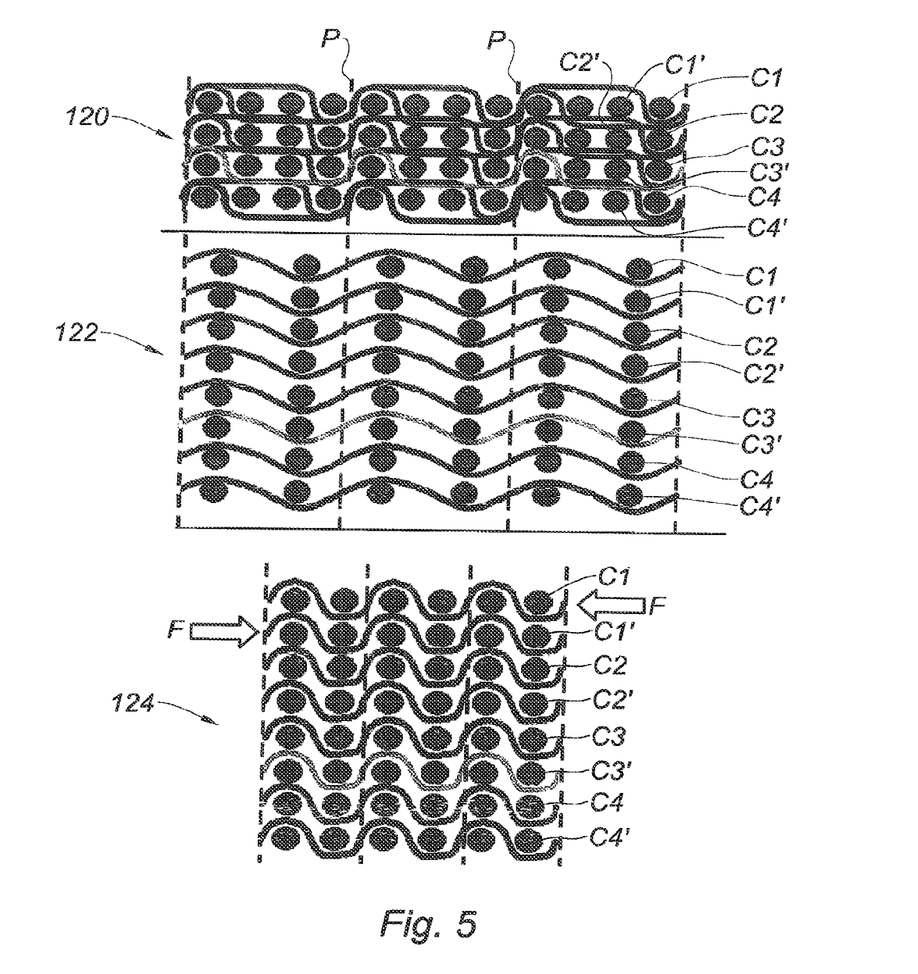
FIG. 5 is a diagram showing successively the different steps of weaving the second portion of the evolutive section according to the present disclosure.

FIG. 5 summarizes three successive operations of forming the second portion B of the evolutive section 20, from four layers of warp yarns c1, c2, c3, c4 which come out from the first portion A.

All the preceding operations, shown in FIGS. 4A and 4B, with the four layers of warp yarns instead of two layers, are carried. First, in the first step 120, as for the previous seventeenth operation 92, we obtain four tightened layers comprising eight weft yarns each taking, on each layer, one warp yarn out of four, these warp yarns taken from the four layers being superimposed.

Then, in the second step 122, as for the previous nineteenth operation 96, we obtain the natural lateral displacement of the warp yarns c1, c1', c2, c2', c3, c3', c4, c4' which are aligned with one another to form four columns between two teeth of the comb P.

Finally, in the third and last step 124, as for the twenty-first previous operation 100, after a tightening of the gap between the teeth of the comb P decreased by two, we obtain eight layers having a density of warp yarns on surface similar to that of the start, with a width reduced by half and a doubled thickness.

It is possible to continue in the same manner to form the following portion of the evolutive section 20 of the profile. At the end, when the final ratio of the height to the width is obtained, the downstream portion of the profile 24 is continued to be woven normally, with a number of layers which remains constant and a comb which preserves the same deviation between its teeth.

A profile including good mechanical performance of the evolutive section in the longitudinal direction is obtained, the warp yarns being all continuous in this direction. In addition, the preform may be carried out on a machine allowing a weaving with finished sides, the subsequent cuttings and falls are reduced, the manufacturing costs of this preform are decreased.

Figure 6:
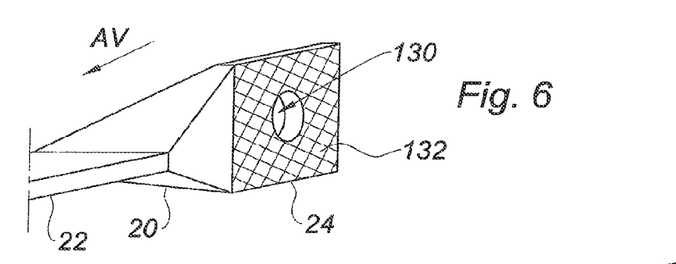
FIG. 6 illustrates a reinforcing type on a flat section comprising a drilling according to one form of the present disclosure.
Figure 7:
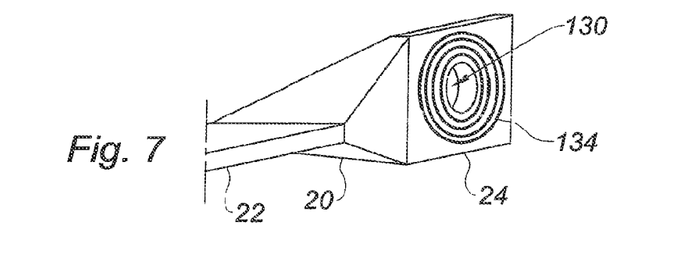
FIG. 7 illustrates a reinforcing type on a flat section comprising a drilling according to another form of the present disclosure.

FIGS. 6 and 7 show an application of a preform of this type. The vertical downstream portion 24 of the finished part after polymerization of the resin, receives a transverse drilling 130 of fixing the end of the part.

FIG. 6 particularly shows a reinforcement of the vertical downstream portion 24 around the drilling 130, comprising the addition of each side of the preform, of a fabric plate also called a "patch" 132, having yarns oriented at +/−45° relative to the longitudinal direction of the warp yarns, so as to complete the resistance in the different directions.

FIG. 7 shows another reinforcement of the vertical downstream portion 24 around the drilling 130, comprising the addition of each side of the preform, of a plate of fibers 134 oriented concentrically around this drilling.

Figure 8:
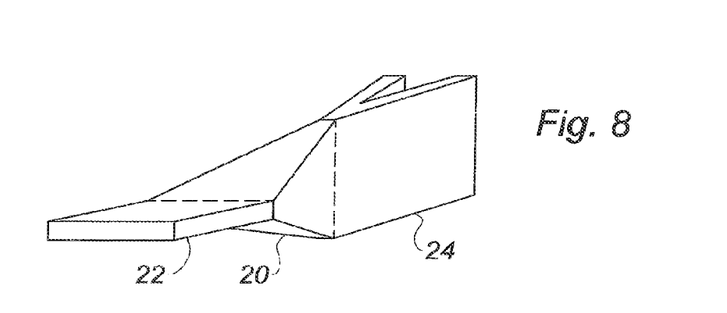
FIG. 8 shows the production of a fork-type fitting according to the present disclosure.

FIG. 8 has an debanding operation of the vertical downstream portion 24, carrying out a vertical section in the median portion of this portion in order to form a fork. Particularly, there can be formed, from this fork, a yoke having on each face reinforcements of a transverse drilling, as shown in FIG. 6 and FIG. 7, in particular to carry out the ends of the rear frame of the thrust reverser cascade shown in FIG. 1.

Figure 9:
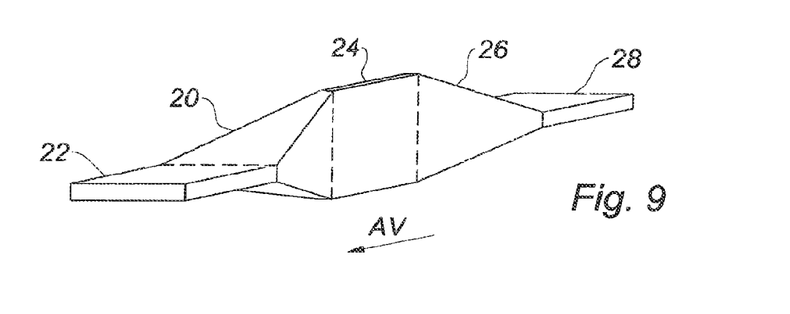
FIG. 9 shows the production of two successive inverted evolutive sections according to the present disclosure.

FIG. 9 shows a preform comprising, downstream of the vertical flat portion 24, a second portion of evolutive section 26 symmetrical to the first portion 20, which carries out a decrease in height at the same time as an increase in the width, in order to obtain again a flat horizontal rear portion 28 similar to the front portion.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A composite structure formed from a preform of reinforcing fibers woven along a longitudinal direction receiving an injected resin, the composite structure being a structural element integrated in a turbojet engine nacelle and comprising:
an evolutive transverse section a width of which is gradually reduced while a height of which is gradually increased, or the width of which is gradually increased while the height of which is gradually decreased, the evolutive transverse section including a plurality of warp yarns which originally define a number of layers along the height,
wherein the width of the evolutive transverse section is gradually reduced by changing weave in the evolutive transverse section by introducing additional weft yarns to increase the number of layers defined by the plurality of warp yarns along the height while simultaneously tightening teeth of a longitudinal settling comb in order to reduce space between the plurality of warp yarns along the width of the evolutive transverse section, and
wherein the width of the evolutive transverse section is gradually increased by reducing a number of weft yarns to reduce the number of layers defined by the plurality of warp yarns along the height while simultaneously spreading the teeth of the longitudinal settling comb.

2. The composite structure according to claim 1, wherein the plurality of warp yarns are superimposed along the height of the evolutive transverse section, the number of layers defined by the plurality of warp yarns is doubled and the width of the evolutive transverse section is reduced to half after the introducing additional weft yarns and the tightening teeth of the longitudinal settling comb.

3. The composite structure according to claim 2, wherein each weft yarn takes, on each layer of warp yarns, one yarn out of four which it leaves on another side, the yarns taken on each layer being superimposed between the different layers.

4. The composite structure according to claim 3 further comprising a flat section disposed adjacent to the evolutive transverse section and reinforcing fibers disposed on flat faces of the flat section.

5. The composite structure according to claim 4, wherein the reinforcing fibers have two orientations crossed substantially at +/−45° relative to the warp yarns or a concentric orientation relative to a drilling hole through the flat section.

6. The composite structure according to claim 2 further comprising a flat section disposed adjacent to the evolutive transverse section, and reinforcing fibers disposed on flat surfaces of the flat section.

7. The composite structure according to claim 6, wherein the reinforcing fibers have two orientations crossed substantially at +/−45° relative to the warp yarns or a concentric orientation relative to a drilling hole through the flat section.

8. The composite structure according to claim 1 further comprising a flat section disposed adjacent to the evolutive transverse section, and reinforcing fibers disposed on flat faces of the flat section.

9. The composite structure according to claim 8, wherein the reinforcing fibers have two orientations crossed substantially at +/−45° relative to the warp yarns or a concentric orientation relative to a drilling hole through the flat section.

* * * * *